US009110716B2

(12) United States Patent
Khatri et al.

(10) Patent No.: US 9,110,716 B2
(45) Date of Patent: Aug. 18, 2015

(54) INFORMATION HANDLING SYSTEM POWER MANAGEMENT DEVICE AND METHODS THEREOF

(75) Inventors: Mukund P. Khatri, Austin, TX (US); Vijay Nijhawan, Austin, TX (US); Dirie N. Herzi, Round Rock, TX (US); Madhusudhan Rangarajan, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 1691 days.

(21) Appl. No.: 12/136,518

(22) Filed: Jun. 10, 2008

(65) Prior Publication Data

US 2009/0307698 A1 Dec. 10, 2009

(51) Int. Cl.
*G06F 9/30* (2006.01)
*G06F 9/48* (2006.01)
*G06F 1/32* (2006.01)

(52) U.S. Cl.
CPC ............ *G06F 9/4893* (2013.01); *G06F 1/3203* (2013.01); *G06F 1/329* (2013.01); *G06F 2209/483* (2013.01); *Y02B 60/1217* (2013.01); *Y02B 60/144* (2013.01)

(58) Field of Classification Search
None
See application file for complete search history.

(56) References Cited

U.S. PATENT DOCUMENTS

| 6,901,522 | B2 | 5/2005 | Buch | |
|---|---|---|---|---|
| 6,966,007 | B2 | 11/2005 | Kuo et al. | |
| 6,968,469 | B1 * | 11/2005 | Fleischmann et al. | 713/324 |
| 7,092,985 | B2 | 8/2006 | Hubbard | |
| 7,299,370 | B2 | 11/2007 | George et al. | |
| 7,793,074 | B1 * | 9/2010 | Wentzlaff et al. | 712/10 |
| 7,797,512 | B1 * | 9/2010 | Cheng et al. | 712/10 |
| 2003/0065752 | A1 * | 4/2003 | Kaushik et al. | 709/220 |

* cited by examiner

*Primary Examiner* — William B Partridge
(74) *Attorney, Agent, or Firm* — Larson Newman, LLP

(57) ABSTRACT

An information handling system includes a set of power and performance profiles. Based on which of the profiles has been selected, the information handling system selects a thread scheduling table for provision to an operating system. The thread scheduling table determines the sequence of processor cores at which program threads are scheduled for execution. In a power-savings mode, the corresponding thread scheduling table provides for threads to be concentrated at subset of available processor cores, increasing the frequency with which the information handling system can place unused processors in a reduced power state.

16 Claims, 3 Drawing Sheets

INFORMATION HANDLING SYSTEM POWER MANAGEMENT DEVICE AND METHODS THEREOF

FIELD OF THE DISCLOSURE

The present disclosure relates to information handling systems and more particularly to power management for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Power management has become increasingly important for information handling systems. In portable information handling systems, such as mobile communication devices or portable computers, power management can extend battery life and improve a user's experience with the system. In larger information handling systems, such as servers, power management can save costs. Accordingly, an improved power management device and methods would be useful.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figures 1, 2:
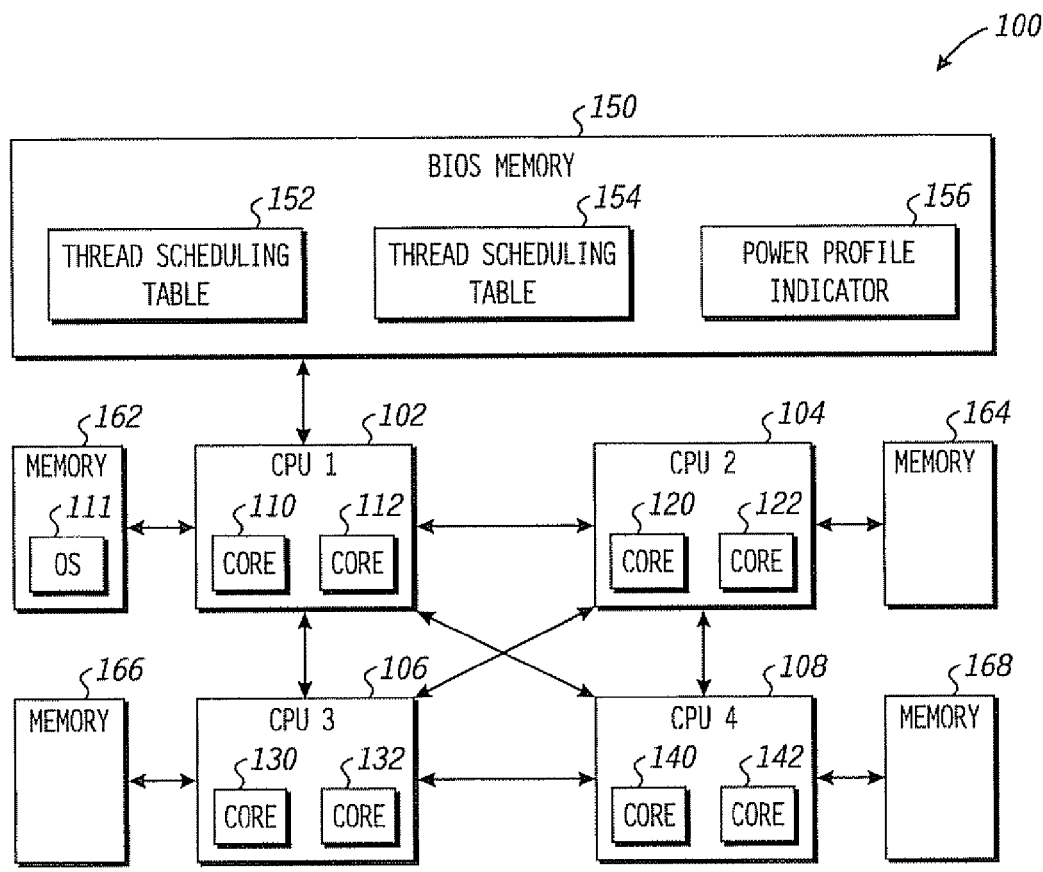
FIG. 1 is a block diagram of an information handling system in accordance with one embodiment of the present disclosure.
FIG. 2 is a diagram illustrating a particular embodiment of thread scheduling tables of the information handling system of FIG. 1.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a personal digital assistant (PDA), a consumer electronic device, a network server or storage device, a switch router, wireless router, or other network communication device, or any other suitable device and can vary in size, shape, performance, functionality, and price. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium™ class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

FIG. 1 illustrates a block diagram of a particular embodiment of an information handling system 100 having central processing units (CPUs) 102, 104, 106, and 108 (CPUs 102-108). The information handling system also includes memories 162, 164, 166, and 168, as well as Basic Input/Output System (BIOS) memory 150.

Each of the CPUs 102-108 includes multiple processor cores. As illustrated, CPU 102 includes cores 110 and 112, CPU 104 includes cores 120 and 122, CPU 106 includes cores 130 and 132, and CPU 108 includes cores 140 and 142. In addition, each of the CPUs 102-108 is connected to an associated memory. In the illustrated embodiment of FIG. 1, CPU 102 is connected to memory 162, CPU 104 is connected to memory 164, CPU 106 is connected to memory 166, and CPU 108 is connected to memory 168. Further, each of the CPUs 102-108 is connected to the other CPUs via a communication link. Additionally, in the illustrated embodiment of FIG. 1, the CPU 102 is connected to the BIOS memory 150.

Each of the CPUs 102-108 is a multi-core data processor configured to execute instructions embodied in a computer program stored at a computer readable medium. In particular, each core at the CPUs 102-108 is configured to execute program instructions. For example, in the illustrated embodiment of FIG. 1, the memory 162 stores an operating system 111 having a set of instructions to manipulate a data processor. The cores of the CPUs 102-108 can be configured to execute the set of instructions embodied in the operating system 111. It will be appreciated that although for purposes of illustration each of the CPUs 102-108 are illustrated as having two cores, in other embodiments each of the CPUs 102-108 can have up to N cores, where N is an integer. In addition, it will be appreciated that although the CPUs 102-108 are illustrated as separate physical CPUs, in an embodiment one or more of the CPUs 102-108 can be a logical CPU, such as a hyperthreaded logical CPU.

In addition, each of the CPUs 102-108 is configured to execute multiple program threads. A program thread represents a particular task or function for a computer program. Thus, a single program can be associated with a single thread (where the single thread represents all the tasks and functions for the program) or with multiple threads (where the program executes different tasks and functions via different threads). In the illustrated embodiment of FIG. 1, each core of the CPUs 102-108 can be assigned to execute a specified program thread. Assignment of a thread to a particular core is referred to herein as "scheduling" the thread. By scheduling multiple threads for simultaneous execution at the CPU cores, the efficiency of the information handling system 100 is increased.

Further, each of the CPUs 102-108 is configured to operate in multiple power modes. In one power mode, referred to herein as a normal or active mode, the cores of a CPU are configured to execute program instructions normally. In another power mode, referred to herein as a low-power mode, power supplied to the CPU is reduced relative to the normal mode, whereby the CPU cores can no longer execute program instructions normally. In some low-power modes, the CPU cores can execute a subset of program instructions, or can execute program instructions at a reduced rate of speed. In other low-power modes, the CPU cores do not execute instructions, but can retain state information in order to resume operations when the CPU is returned to the normal mode. In a particular embodiment, each of the CPUs 102-108 can be configured to operate in multiple low-power modes. A power management module (not shown) can determine the activity of each of the CPUs 102-108 and set the power mode for each CPU accordingly. For example, if the power management module determines that the cores of a CPU does not have any threads scheduled for execution, the power management module can place the CPU in a low-power mode to conserve power. In an embodiment, the functions of the power management module can be performed by the operating system 111.

In addition, each of the CPUs 102-108 can be configured to operate in different memory access modes. In one mode, referred to herein as interleaved memory mode, each of the CPUs 102-108 can access any of the memories 162-168 in order to execute program instructions. In another mode, referred to herein as Non-Uniform Memory Access (NUMA) mode, threads executing at one CPUs 102-108 can, among the memories 162-168, access the local memory for the CPU more quickly or efficiently than memories associated with other CPUs. Thus, in NUMA mode, threads executing at the CPU 102 can access the memory 162 more efficiently than they can access the memories 164, 166, and 168.

In the illustrated embodiment of FIG. 1, the CPU 102 is a bootstrap processor, and is configured to receive BIOS information from the BIOS memory 150. In particular, in response to a power-on reset (POR) event, the CPU 102 requests configuration information, such as BIOS information, from the BIOS memory 150. In response to receiving the BIOS information, the CPU 102 can configure one or more aspects of the information handling system 100. For example, the CPU 102 can configure input and output devices, initiate execution of the operating system 111, and the like.

Each of the memories 162-168 can be computer readable media such as volatile memory (e.g. random access memory (RAM)) or non-volatile memory (e.g. flash memory). In a particular embodiment, the memories 162-168 are RAM memories that represent a cache memory for one or more of the CPUs 102-108. Accordingly, in this embodiment each of the memories 162-168 stores a subset of data stored at a larger RAM memory (not shown).

In addition, each of the memories 162-168 can operate in multiple power modes. In a normal or active mode, the memory is configured to respond to memory access (e.g. read or write) requests normally. In a low-power mode, the memory is configured to enter a self-refresh state, whereby the memory retains information stored at the memory, but cannot respond to memory access requests. In other low-power modes, the memory can be configured to respond to memory access requests, but at a reduced speed relative to the active mode. In the low-power modes, a lower voltage can be supplied to the memory so that it consumes less power. In an embodiment, a power management module (not shown) can set the power modes of each of the memories 162-168 individually. For example, the power management module can set the power of the memory 164 to a low-power state while setting the power mode of the memory 168 to a normal state.

The BIOS memory 150 is non-volatile memory, such as read-only memory (ROM) or flash memory configured to store configuration information, such as BIOS information. In response to a POR event, the BIOS memory is configured to receive a request for the configuration information, and provide the information in response to the request. The configuration information can include hardware configuration information, software configuration information, and the like.

In the illustrated embodiment of FIG. 1, the configuration information includes thread scheduling tables 152 and 154 and power profile indicator 156. Each of the thread scheduling tables 152 and 154 indicate a specified order of thread scheduling for the cores of the CPUs 102-108. The thread scheduling table 152 is configured to list the cores in an interleaved format. As used herein, an interleaved format refers to a format whereby all of the cores associated with a particular CPU are not listed together, but instead are separated by the listing of cores associated with other CPUs. An example of a thread scheduling table having an interleaved format is illustrated in FIG. 2 as thread scheduling table 252.

In the illustrated example, thread scheduling table lists core 110 (associated with CPU 102) first, followed by core 120 (associated with CPU 104), which is in turn followed by core 130 (associated with CPU 106), which is followed by core 140 (associated with CPU 108). Following core 140, core 112 (associated with CPU 102 is listed), followed by cores 122, 132, and 142.

Referring again to FIG. 1, the thread scheduling table 154 is configured to set forth the cores in a sequential format. As used herein, a sequential format refers to a format whereby each core of a particular CPU is listed together, so that all the cores of the CPU are listed before or after the cores of another CPU. An example of thread scheduling table having a sequential format is illustrated in FIG. 2 as thread scheduling table 254. In the illustrated embodiment, cores 110 and 112, associated with CPU 102, are listed together, followed by cores 120 and 122, associated with CPU 104. Cores 120 and 122 are followed by cores 130 and 132, associated with CPU 106, which are in turn followed by cores 140 and 142, associated with CPU 108.

In a particular embodiment, the thread scheduling tables 152 and 154 comply with the Advance Configuration and Power Interface (ACPI) specification, and are configured as complete or portions of tables accessible by the operating system 111. In addition, each of the thread scheduling tables 152 and 154 can be configured to identify each core according to an advanced programmable interrupt controller (APIC) identification number. For example, in one embodiment the thread scheduling tables 152 and 154 are each a local APIC table. Accordingly, in one embodiment the tables 152 and 154 are APIC tables that an operating system can access to identify how many cores are available for execution of threads, and how the assignment of threads the available cores should be sequenced.

The power profile indicator 156 is configuration information identifying a power profile of the information handling system 100. In an embodiment, the power profile indicator 156 is programmable by a user of the system via a BIOS configuration program (not shown) or other configuration tool. The configuration tool can provide a set of power profile options for selection by the user, and the power profile indicator 156 is set based on the selected option. For example, the power profile indicator 156 can indicate whether the information handling system 100 should operate in a performance mode, where the speed at which tasks are performed is increased, or should operate in a power savings mode, where the information handling system 100 consumes less power but performs tasks at a reduced rate of speed relative to the performance mode.

As described further herein, the information handling system 100 is configured to assign threads for execution at the CPU cores in a sequence that is based upon the power profile for the system. Thus, if the power profile indicator 156 indicates the information handling system 100 is in a performance mode, the system assigns threads for execution in a distributed fashion to increase the number of CPUs that are executing threads. If the power profile indicator 156 indicates the information handling system 100 is in a power savings mode, the system assigns threads for execution in such a way as to concentrate threads at fewer CPUs. This increases the likelihood that one or more of the CPUs 102-108 will not be assigned a thread, allowing those CPUs not executing threads to be placed in a low-power state to conserve power.

In addition, as explained further herein, threads are assigned for execution at the CPU cores based on a thread scheduling table. In particular, the thread scheduling table identifies a sequence of CPU cores, and an operating system the information handling system 100 assigns threads to the cores based on the sequence. Accordingly, the information handling system 100 can control the power profile for the system by providing the appropriate thread scheduling table, with the appropriate sequence of CPU cores, to the operating system.

In operation, the operating system 111 is configured to schedule execution of program threads for one or more applications (not shown) executing at the information handling system 100. To illustrate, after a POR event the operating system 111 requests a thread scheduling table from the BIOS memory 150 in order to determine how threads should be scheduled for execution at the CPUs 102-108. In response the CPU 102 accesses the power profile indicator 156 to determine a power profile for the information handling system 100. Based on the indicated power profile, the CPU 102 retrieves one of the thread scheduling tables 152 and 154 and provides the retrieved table to the operating system 111. In response, the operating system 111 schedules execution program threads according to the retrieved table.

The operation of the information handling system 100 can be better understood with reference to an example. In this example, the operating system 111 requests thread scheduling information. In response, the CPU 102 determines that the power profile indicator 156 indicates that the information handling system 100 is in a performance mode and therefore retrieves thread scheduling table 152. As explained, thread scheduling table 152 sets forth the cores of the CPUs 102-108 in interleaved format. Accordingly the CPU 102 provides thread scheduling information based on the table to the operating system 111, which then schedules execution of program threads according to the table.

Figure 3:
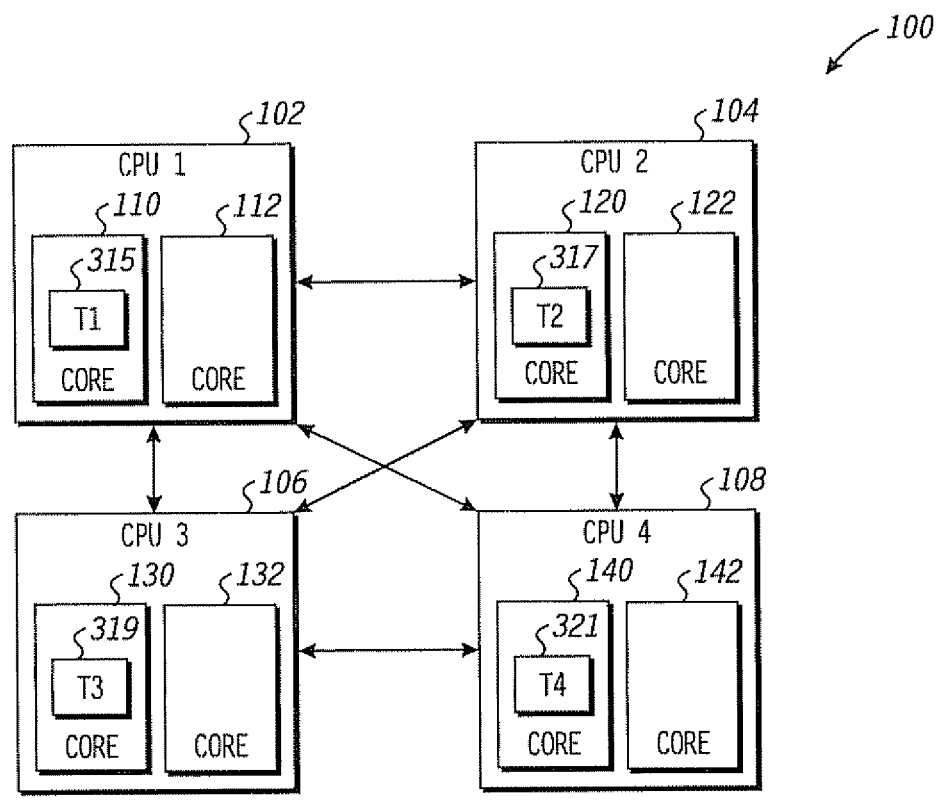
FIG. 3 is a block diagram illustrating a particular embodiment of thread scheduling at the information handling system of FIG. 1.

FIG. 3 illustrates a particular embodiment of thread scheduling based on the interleaved format of thread scheduling table 152. In the illustrated embodiment of FIG. 3, the operating system 111 schedules execution of four threads, designated threads 315, 317, 319, and 321. To schedule execution of the four threads, the operating system 111 accesses scheduling information according to the thread scheduling table 152. According to the table, the first thread, designated as thread 315, is scheduled for execution at core 110 of CPU 102. The operating system schedules second thread, designated as thread 317, for execution at the core 120 of CPU 104, and schedules execution of the third thread, designated as thread 319, at the core 130 of CPU 106. Further, based on the thread scheduling table 152, the operating system 111 schedules the fourth thread, designated as thread 321, for execution at core 140 of core 108.

Thus, in the illustrated example of FIG. 3, scheduling threads based on the thread scheduling table 152 results in threads being distributed among the CPUs 102-108, so that a thread is not scheduled for execution of a thread at a second core until all CPUs have at least one core scheduled to execute a thread. This reduces the average number of cores executing at each CPU over time. Further, when one or more cores of a CPU is not executing a thread, the CPU is able to devote more resources to the cores that are executing threads, thereby improving the performance of the executing cores. Thus, by reducing the average number of cores that execute threads over time at a CPU, the performances of the CPU is improved, thereby improving the overall performance of the information handling system 100. Accordingly, scheduling of threads according to the thread scheduling table 152 can improve system performance, corresponding to the performance mode indicated by the power profile indicator 156.

Figure 4:
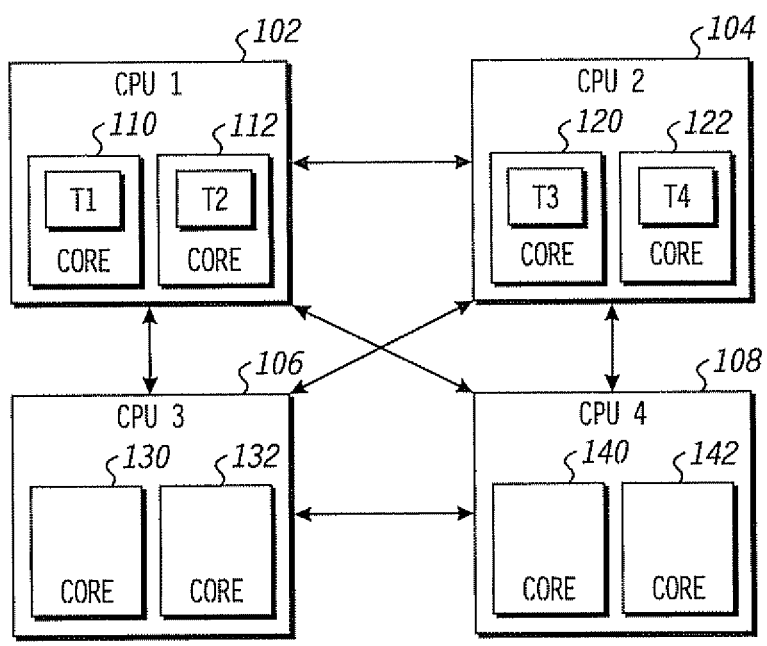
FIG. 4 is a block diagram illustrating an alternative embodiment of thread scheduling at the information handling system of FIG. 1.

Referring again to FIG. 1, if the power profile indicator 156 the information handling system 100 is in a "power savings"

mode, the operating system 111 will be provided with the thread scheduling table 154. FIG. 4 illustrates a particular embodiment of thread scheduling based on the sequential format of thread scheduling table 154. In the illustrated embodiment of FIG. 4, the operating system 111 schedules execution of the four threads 315, 317, 319, and 321. To schedule execution of the four threads, the operating system 111 accesses scheduling information according to the thread scheduling table 152. According to the table, the first thread 315 is scheduled for execution at core 110 of CPU 102 and the second thread 317, for execution at the core 112 of CPU 102. The operating system 111 further schedules execution of the third thread 319, at the core 120 of CPU 104 and schedules the fourth thread 321, for execution at core 122 of core 104. Thus, in the illustrated embodiment of FIG. 4, threads are not scheduled for CPUs 106 and 108. Accordingly, the power management module can place CPUs 106 and 108 in a low-power mode, thereby conserving power.

Thus, as illustrated in FIG. 4, scheduling execution of threads according to the thread execution table 154 can result in fewer CPUs having cores scheduled to execute threads. This allows the information handling system 100 to more frequently place the unused CPUs in a low-power state, and can also allow the information handling system 100 to more frequently place the unused CPU into a deeper low-power state (i.e. a low-power state that consumes less power than other low-power states), thereby reducing power consumption of the system.

Referring again to FIG. 1, the information handling system 100 can also set the memory access configuration based on the power profile indicator 156. For example, if the power profile indicator 156 indicates the information handling system 100 is in the "power savings" mode, the system 100 can set the memory access mode to a NUMA mode. This allows the memories associated with CPUs that are not scheduled to execute threads to be placed in a self-refresh or other low power state, conserving power. If the power profile indicator indicates the information handling system 100 is in the performance state, the system 100 can set the memory access mode to an interleaved memory mode, so that each of the memories 162-168 are accessible to each of the CPUs 106-108, thereby improving performance.

Figure 5:
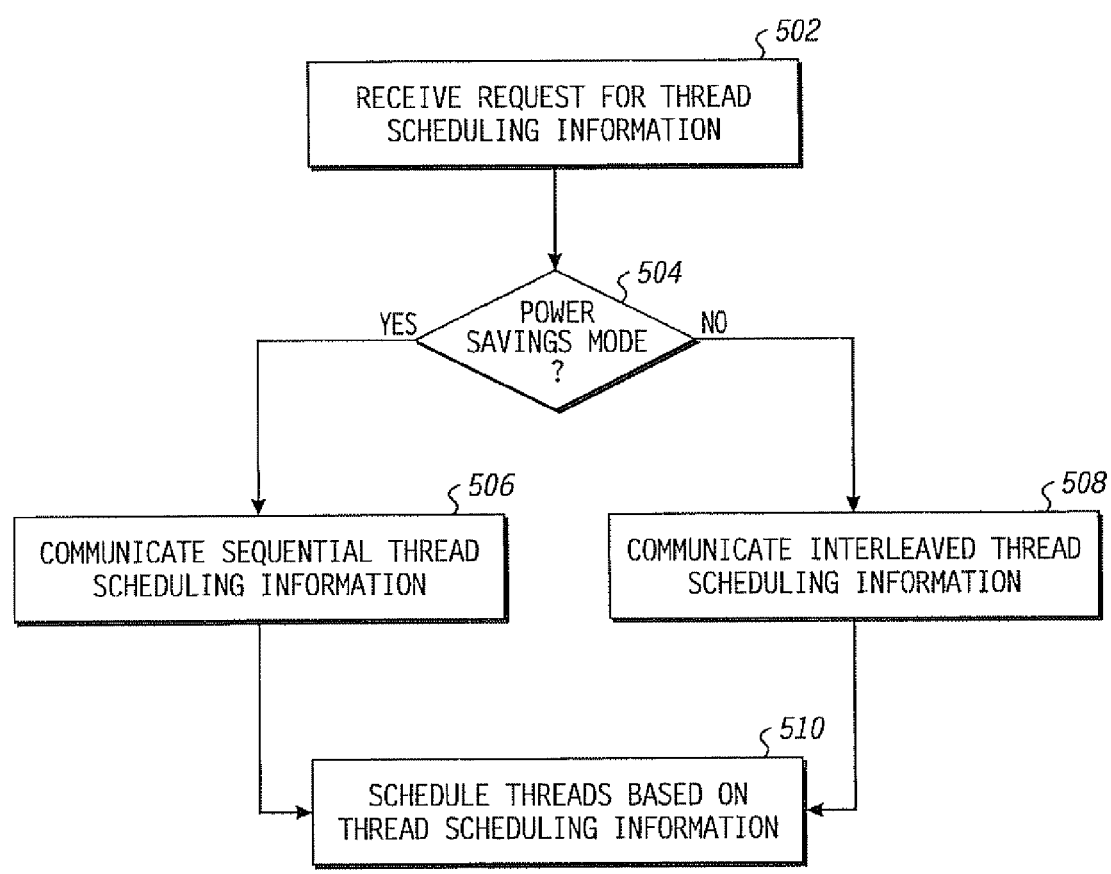
FIG. 5 is a flow diagram of a method of scheduling execution of threads at an information handling system in accordance with one embodiment of the present disclosure.

Referring to FIG. 5, a flow diagram of a method of scheduling threads for execution at an information handling system is illustrated. At block 502, a request for thread scheduling information is received from an operating system. At block 504, the information handling system determines a mode of operation for the system. If the mode of operation indicates a power savings mode, the method flow moves to block 506, and thread scheduling information setting forth cores of the system in sequential format is communicated to the operating system. If, at block 504, it is determined that the mode of operation is not a power savings mode, the method flow moves to block 508, and thread scheduling information setting forth the system cores in interleaved format is communicated to the operating system. At block 510, the operating system schedules execution of a plurality of program threads according to the communicated thread scheduling information.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   detecting a power-on reset event in an information handling system;
   requesting, by a first central processing unit (CPU), configuration information including thread scheduling information in response to the power-on reset event in the information handling system;
   communicating first thread scheduling information in response to the request, the first thread scheduling information identifying processor cores in a sequential format, wherein each of a first plurality of processor cores of the first CPU assigned a program thread prior to one of a second plurality of processor cores of a second CPU being assigned a program thread;
   communicating second thread scheduling information in response to the request, the second thread scheduling information identifying that one of the first plurality of processor cores of the first CPU is assigned a program thread and one of the second plurality of processor cores of the second CPU is assigned a program thread prior to a second one of the first plurality of processor cores of the first CPU being assigned a program thread;
   placing the second CPU in a low-power mode in response to each of the second plurality of processor cores of the second CPU not having any threads scheduled for execution;
   communicating third thread scheduling information to reduce a number of the first processor cores executing threads in the first CPU, and to improve a performance of the first CPU by the first CPU providing more resources to the first processor cores in the first CPU that are executing threads; and retaining, during the low-power mode, state information in each of the first plurality of processor cores in order to resume operations when the first central processing unit is returned to a normal mode.

2. The method of claim 1, wherein communicating the first thread scheduling information comprises communicating the first thread scheduling information in response to determining a mode of operation of the information handling system is a first mode associated with a power savings mode of the information handling system.

3. The method of claim 2, further comprising setting a memory access mode of the information handling device to a non-uniform memory access (NUMA) mode in response to determining the mode of operation is the first mode.

4. The method of claim 2, further comprising scheduling execution of a first thread based on the first thread scheduling information.

5. The method of claim 2, wherein the mode of operation is programmable.

6. The method of claim 2, further comprising determining the mode of operation based on Basic Input/Output System (BIOS) information.

7. The method of claim 1, wherein the first thread scheduling information comprises an Advanced Configuration and Power Interface (ACPI) table.

8. The method of claim 7, wherein the ACPI table is a local Advanced Programmable Interrupt Controller (APIC) table.

9. A method comprising:
determining a mode of operation of an information handling system;
in response to determining the mode of operation is a first mode corresponding to a non-power savings mode of the information handling system:
communicating first thread scheduling information indicating that all CPUs have at least one core scheduled to execute a program thread before a second processor core of a first CPU is scheduled for execution of a program thread, wherein the first thread scheduling information reduces a number of cores executing threads in the first CPU, and improves a performance of the first CPU by the first CPU providing more resources to the cores in the first CPU that are executing threads;
in response to determining that the mode of operation is a second mode corresponding to a power savings mode of the information handling system, communicating second thread scheduling information indicating that all processor cores of the first CPU are scheduled to execute a program thread before a processor core of a second CPU is scheduled for execution of a program thread; and placing the second CPU in a low-power mode in response to each of the second plurality of processor cores of the second CPU not having any threads scheduled for execution.

10. The method of claim 9, further comprising: in response to determining the mode of operation is the first mode, setting a memory access mode of the information handling device to a non-uniform memory access (NUMA) mode.

11. An information handling system comprising:
a first central processing unit (CPU) comprising a first plurality of processor cores;
a second CPU comprising a second plurality of processor cores;
a first memory configured to store first thread scheduling information indicating that one of the first plurality of processor cores of the first CPU is assigned a program thread and one of the second plurality of processor cores of the second CPU is assigned a program thread prior to a second one of the first plurality of processor cores of the first CPU being assigned a program thread, wherein the first thread scheduling information reduces a number of cores executing threads in the first CPU, and improves a performance of the first CPU by the first CPU providing more resources to the cores in the first CPU that are executing threads, and configured to store second thread scheduling information identifying that all of the processor cores of the first CPU are assigned program threads prior to one of the second plurality of processor cores of the second CPU are assigned a program thread, wherein the second CPU is placed in a low-power mode in response to each of the second plurality of processor cores of the second CPU not having any threads scheduled for execution.

12. The information handling system of claim 11, wherein the first memory is configured to store configuration information selectively identifying the first thread scheduling information and the second thread scheduling information based on a profile indicator associated with the information handling system.

13. The information handling system of claim 12, further comprising a second memory, a memory access mode of the second memory based on the configuration information.

14. The information handling system of claim 12, wherein the configuration information is programmable information.

15. The information handling system of claim 11, wherein the first thread scheduling information comprises an Advanced Configuration and Power Interface (ACPI) table.

16. The information handling system of claim 15, wherein the ACPI table is a local Advanced Programmable Interrupt Controller (APIC) table.

* * * * *